(12) United States Patent
Cornellier

(10) Patent No.: US 6,698,480 B1
(45) Date of Patent: Mar. 2, 2004

(54) NON-PNEUMATIC TIRE AND WHEEL SYSTEM

(76) Inventor: Maurice H. Cornellier, 7611 E. Broyhill Pl., Inverness, FL (US) 34450

( * ) Notice: Subject to any disclaimer, the term of this patent is extended or adjusted under 35 U.S.C. 154(b) by 0 days.

(21) Appl. No.: 10/290,840

(22) Filed: Nov. 8, 2002

(51) Int. Cl.[7] .............................. B60B 9/08; B60B 9/18
(52) U.S. Cl. ........................... 152/100; 152/55; 152/97; 152/105
(58) Field of Search .............................. 152/5, 7, 11, 12, 152/17, 55, 87, 97, 100 I, 101, 103, 105

(56) References Cited

U.S. PATENT DOCUMENTS

| | | | | | |
|---|---|---|---|---|---|
| 804,202 A | * | 11/1905 | Borchers | ..................... | 152/97 |
| 1,014,131 A | * | 1/1912 | Dennis | ........................ | 152/98 |
| 1,077,388 A | * | 11/1913 | Bray | .............................. | 152/7 |
| 1,095,956 A | * | 5/1914 | Butler | ......................... | 152/98 |
| 1,158,795 A | * | 11/1915 | Endicott | ..................... | 152/100 |
| 1,299,876 A | * | 4/1919 | Van Noort et al. | ............. | 152/7 |
| 1,446,932 A | * | 2/1923 | Salus | ......................... | 152/98 |
| 1,650,609 A | * | 11/1927 | Cravens | ...................... | 152/100 |
| 4,295,658 A | * | 10/1981 | Kashima | ..................... | 280/276 |
| 4,950,030 A | * | 8/1990 | Kindel et al. | ............... | 305/137 |
| 5,070,697 A | * | 12/1991 | Van Zeggeren | .............. | 60/527 |

* cited by examiner

Primary Examiner—S. Joseph Morano
Assistant Examiner—Jason R. Bellinger
(74) Attorney, Agent, or Firm—Edward P. Dutkiewicz

(57) ABSTRACT

A non-pneumatic tire and wheel system comprises a tire having an exterior tread surface with a tread pattern and an interior surface. A wheel has a hub and a rim assembly. A plurality of radially oriented shock absorbing spokes each have radially interior and radially exterior ends for coupling the hub and rim assembly. Apertures through the hub allow pivotably coupling the hub to a spoke at the radially interior end of the spoke. Apertures through the rim assembly allow pivotably coupling the rim assembly to a spoke at the radially exterior end of the spoke. Each shock absorbing spoke has a central cylindrical tube with interior and exterior caps. Each spoke has an interior piston and rod and a pin. The pin pivotably couples the spoke to the hub. Each spoke has an exterior piston and rod and a pin. The pin pivotably couples the spoke to the rim assembly.

4 Claims, 4 Drawing Sheets

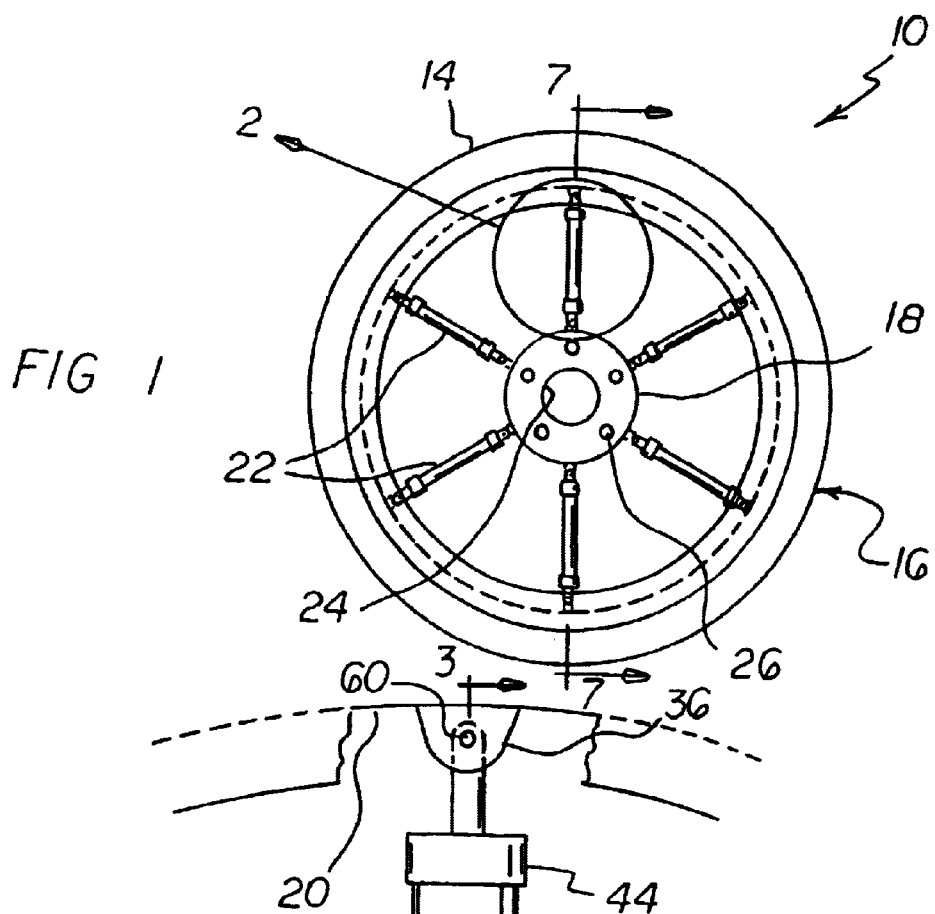
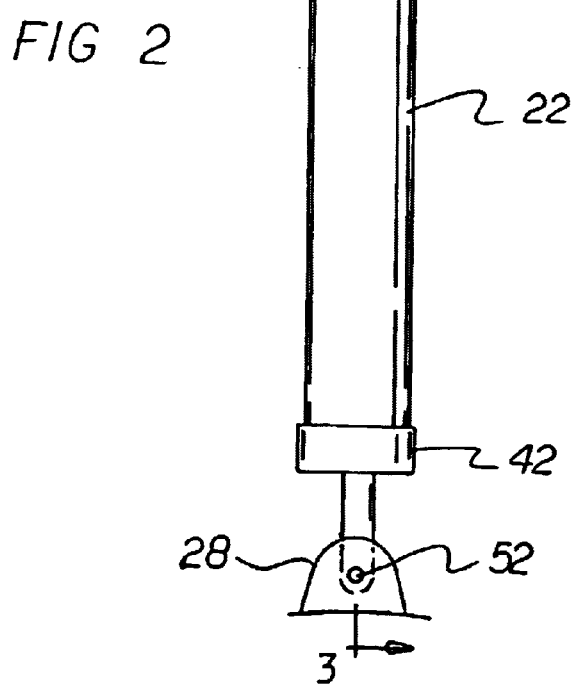
FIG 1
FIG 2

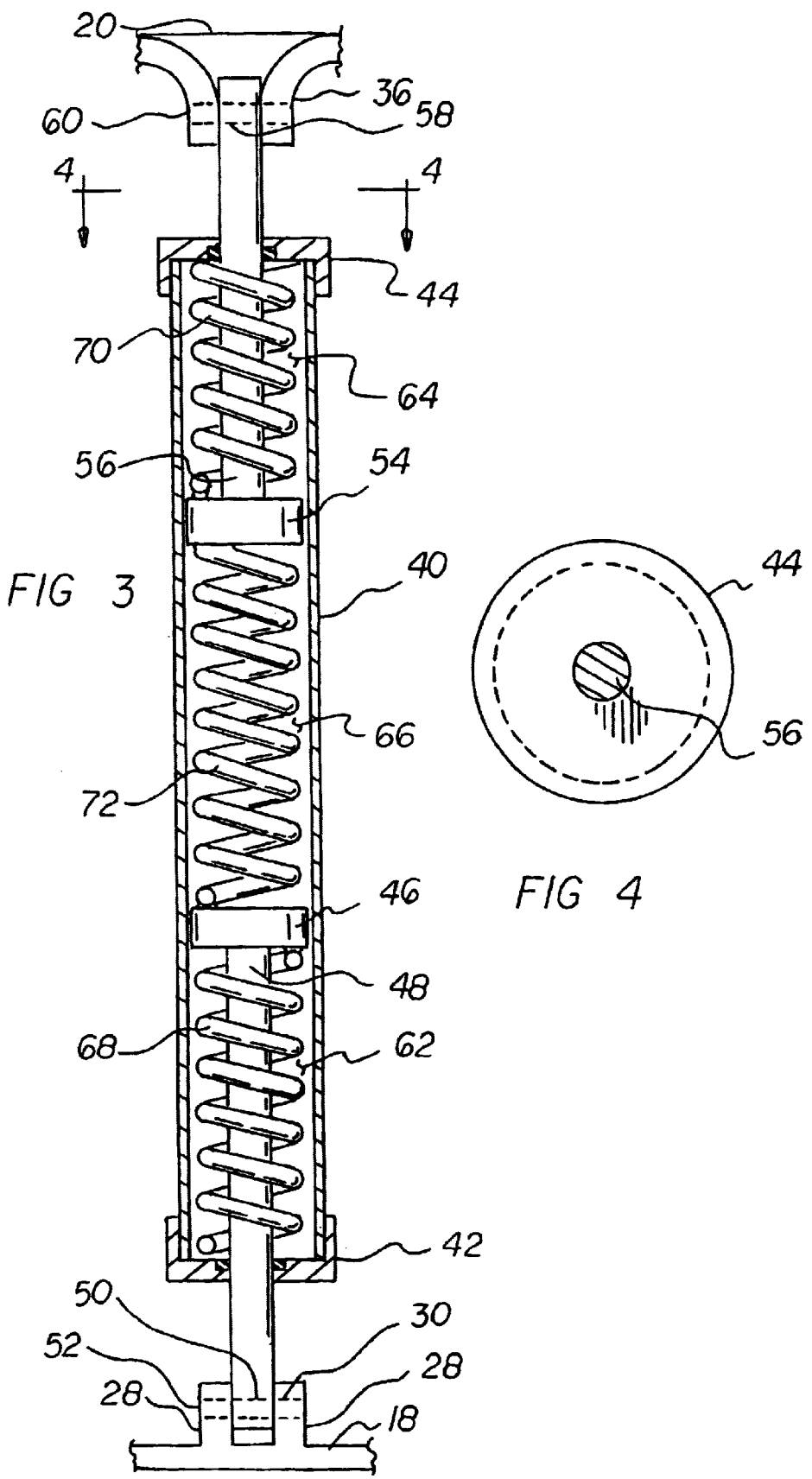

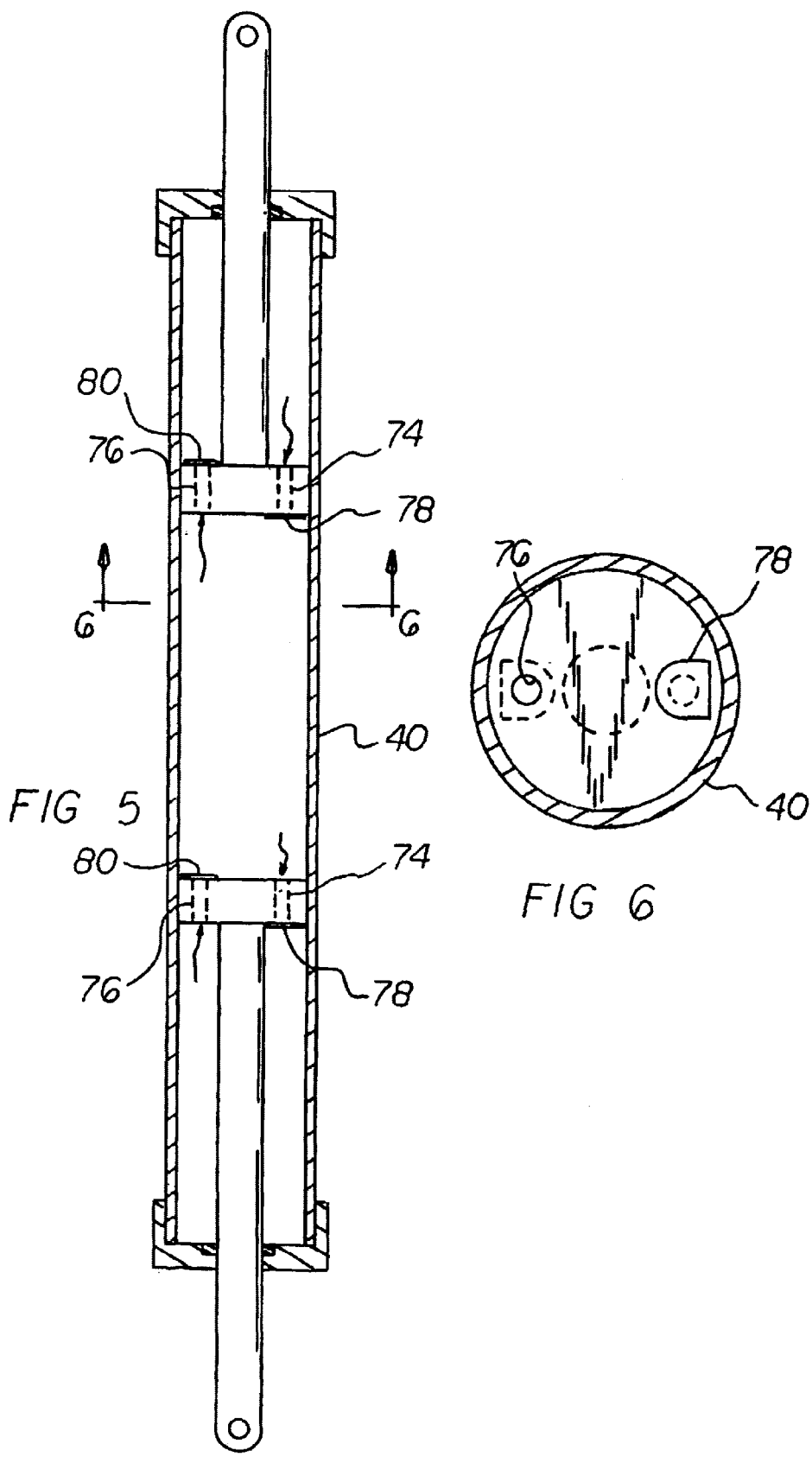

NON-PNEUMATIC TIRE AND WHEEL SYSTEM

BACKGROUND OF THE INVENTION

1. Field of the Invention

The present invention relates to a non-pneumatic tire and wheel system and more particularly pertains to absorbing shocks while driving and also eliminating the prospects of flat tires.

2. Description of the Prior Art

The use of tires and wheels of known designs and configurations is known in the prior art. More specifically, tires and wheels of known designs and configurations previously devised and utilized for the purpose of reducing shocks and flat tires while driving through conventional methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,295,658 to Kashima discloses a front end shock absorbing apparatus for wheeled vehicle and U.S. Pat. No. 5,070,697 to Van Zeggeren discloses an actuator with memory metal and a shock absorber provided with this actuator.

While these devices fulfill their respective, particular objectives and requirements, the aforementioned patents do not describe a non-pneumatic tire and wheel system that allows absorbing shocks while driving and also eliminating the prospects of flat tires.

In this respect, the non-pneumatic tire and wheel system according to the present invention substantially departs from the conventional concepts and designs of the prior art, and in doing so provides an apparatus primarily developed for the purpose of absorbing shocks while driving and also eliminating the prospects of flat tires.

Therefore, it can be appreciated that there exists a continuing need for a new and improved non-pneumatic tire and wheel system which can be used for absorbing shocks while driving and also eliminating the prospects of flat tires. In this regard, the present invention substantially fulfills this need.

SUMMARY OF THE INVENTION

In view of the foregoing disadvantages inherent in the known types of tires and wheels of known designs and configurations now present in the prior art, the present invention provides an improved non-pneumatic tire and wheel system. As such, the general purpose of the present invention, which will be described subsequently in greater detail, is to provide a new and improved non-pneumatic tire and wheel system and method which has all the advantages of the prior art and none of the disadvantages.

To attain this, the present invention essentially comprises a solid tire. The tire is fabricated of an elastomeric material, either plastic or rubber or blends thereof. The tire is in an annular configuration. The tire further has an exterior tread surface and an interior surface.

A wheel is provided. The wheel has a hub and a rim assembly. The hub and rim assembly share a common axis of rotation. A plurality of radially oriented shock absorbing spokes are provided. Each spoke has a radially interior end and a radially exterior end for coupling the hub assembly and rim.

A large central bore is provided through the middle of the hub. A plurality of smaller apertures are provided. The smaller apertures are equally spaced around the periphery for removably coupling the wheel to a vehicle. A plurality of radial extending lips are provided. Apertures are provided through the lips pivotably coupling the hub to a spoke at its radially interior end.

The rim assembly has an interior rim and an exterior rim. The interior rim has a plurality of inwardly radially extending lips. Apertures are provided through the lips for pivotably coupling the rim assembly to a spoke at its radially exterior end.

Each of the shock absorbing spokes has a central cylindrical tube. Each tube has an interior cap having an aperature and an exterior cap having an aperture. Each spoke has an interior piston, a rod with an aperture, and a pin. The pin pivotably couples one of the spokes to the hub. Each spoke has an exterior piston, a rod with an aperture and a pin. The pin pivotably couples one of the spokes to the rim assembly. The interior pistons and exterior pistons divide the space within each tube into an interior chamber, an exterior chamber and a central chamber. An interior coil spring is provided between the interior cap and the interior piston. An exterior coil spring is provided between the exterior cap and exterior piston. An intermediate coil spring is provided between the interior and exterior pistons. Two one-way valves are provide through each piston. Each valve includes an aperture for the flow of fluid, preferably air, there through. A resilient uni-directional flapper is provided. In this manner, the rim assembly and spokes will deform when encountering a bump while the coil springs and valves will cushion the bumps during operation and use.

It is another object of the present invention to provide a new and improved non-pneumatic tire and wheel system which may be easily and efficiently manufactured and marketed.

It is further an object of the present invention to provide a new and improved non-pneumatic tire and wheel system which is of durable and reliable constructions.

Even still another object of the present invention is to provide a non-pneumatic tire and wheel system for absorbing shocks while driving and also eliminating the prospects of flat tires.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is side elevational view of a non-pneumatic tire and wheel system constructed in accordance with the principles of the present invention.

FIG. 2 is an enlarged side elevational view taken at circle 2 of FIG. 1.

FIG. 3 is a cross sectional view taken along line 3—3 of FIG. 2.

FIG. 4 is a cross sectional view taken along line 4—4 of FIG. 3.

FIG. 5 is a cross sectional view taken along line 5—5 of FIG. 4.

FIG. 6 is a cross sectional view taken along line 6—6 of FIG. 5.

The same reference numerals refer to the same parts throughout the various Figures.

DESCRIPTION OF THE PREFERRED EMBODIMENT

Figure 7:
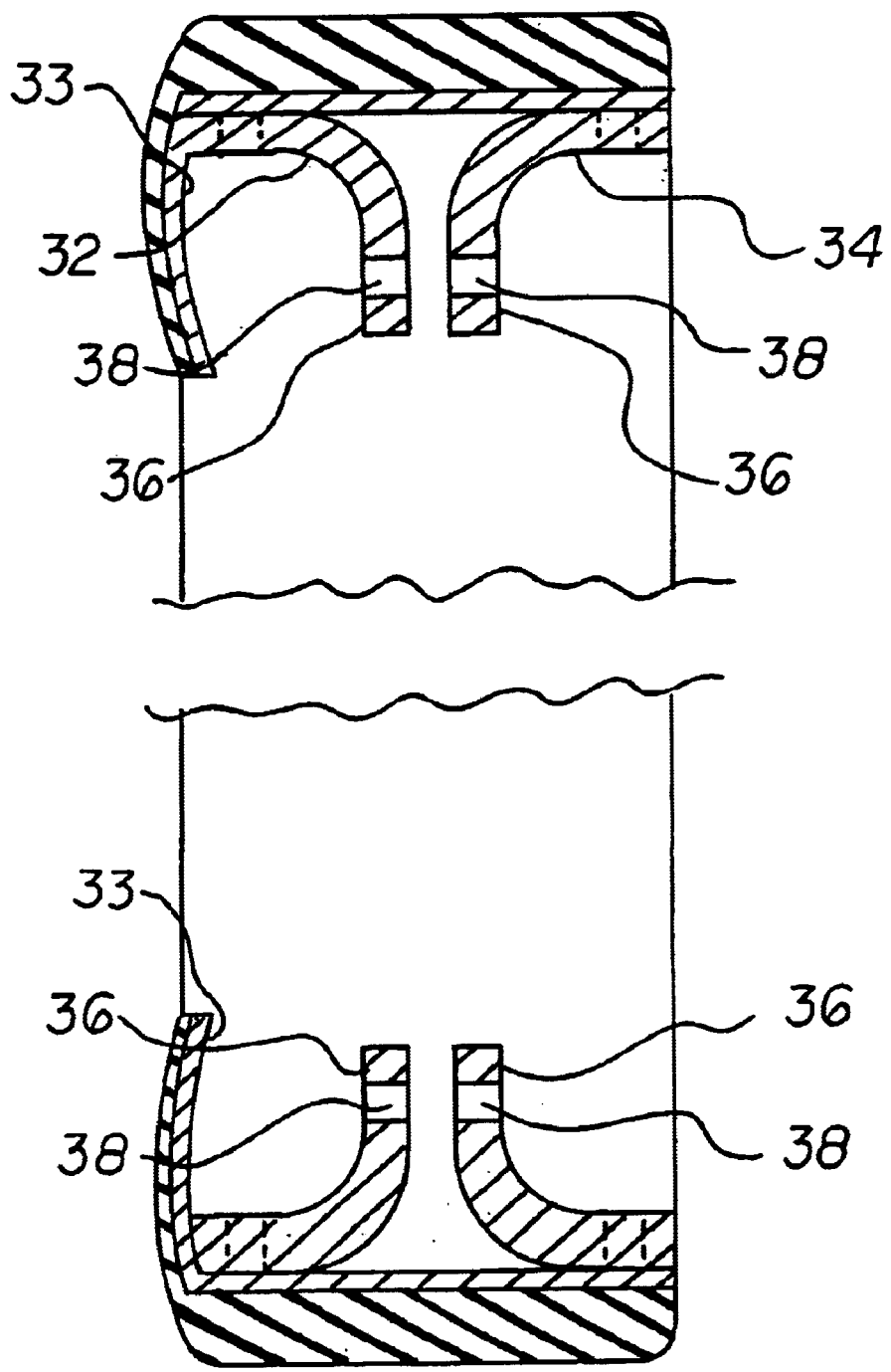
FIG. 7 is a cross-sectional view of the tire and wheel system of the present invention taken along line 7—7 of FIG. 1.

With reference now to the drawings, and in particular to FIG. 1 thereof, the preferred embodiment of the new and improved non-pneumatic tire and wheel system embodying the principles and concepts of the present invention and generally designated by the reference numeral 10 will be described.

The present invention, the non-pneumatic tire and wheel system 10 is comprised of a plurality of components. Such components in their broadest context include a tire, a wheel and shock absorbing spokes. Such components are individually configured and correlated with respect to each other so as to attain the desired objective.

First provided is a solid tire 14. The tire is fabricated of an elastomeric material, either plastic or rubber or blends thereof. The tire is in an annular configuration. The tire further has an exterior tread surface and an interior surface. The exterior surface has a tread pattern for traction and for dispersing water from a roadway to preclude skidding.

A wheel 16 is provided. The wheel has a hub 18 and a rim assembly 20. The hub and rim assemblies share a common axis of rotation. A plurality of radially oriented shock absorbing spokes 22 are provided. Each spoke has a radially interior end and a radially exterior end for coupling the hub and rim assembly.

A large central bore 24 is provided through the middle of the hub 18. A plurality of smaller apertures 26 are provided. The smaller apertures are equally spaced around the periphery for removably coupling the wheel to a vehicle. A plurality of radial extending lips 28 are provided. Apertures 30 are provided through the lips pivotably coupling the hub to a spoke at its radially interior end.

The rim assembly 20 has an interior rim 32 and an exterior rim 34. The interior rim has a plurality of inwardly radially extending lips 36. Apertures 38 are provided through the lips for pivotably coupling the rim assembly to a spoke at its radially exterior end. The interior rim 32 has an annular skirt 33 with a rubber exterior to simulate a conventional pneumatic tire. The exterior rim 34 may also be provided with a similar skirt and rubber exterior. A conventional hub cap may also be included.

Each of the shock absorbing spokes 22 has a central cylindrical tube 40. Each tube has an interior cap 42 having an aperature and an exterior cap 44 having an aperture. Each spoke has an interior piston 46, a rod 48 with an aperture 50 and a pin 52. The pin pivotably couples one of the spokes to the hub. Each spoke has an exterior piston 54, a rod 56 with an aperture 58 and a pin 60. The pin pivotably couples one of the spokes to the rim assembly. The interior pistons and exterior pistons divide the space within each tube into an interior chamber 62, an exterior chamber 64 and a central chamber 66. An interior coil spring 68 is provided between the interior cap and the interior piston. An exterior coil spring 70 is provided between the exterior cap and exterior piston. An intermediate coil spring 72 is provided between the interior and exterior pistons. Two one-way valves are provide through each piston. Each valve includes an aperture 74, 76 for the flow of fluid, preferably air, there through. A resilient uni-directional flapper 78, 80 is provided. In this manner the rim assembly and spokes will deform when encountering a bump while the coil springs and valves will cushion the bumps during operation and use.

The high number of people severely hurt or killed in traffic accidents on the highways is shocking. A study of all the accidents revealed that defective tires were a primary cause of accidents. The inventigation revealed that all the tires involved in these accidents were not properly manufactured to meet all required safety standards.

It can be seen from the foregoing that it is imperative and necessary for safety changes wheels and tires to be incorporated as soon as possible. The present invention, a new all weather/wheel will consist of a circular steel rim, to which a one inch thick solid rubber tire will cover the outer circumferential surface which comes in contact with the road surface. This solid one inch thick rubber tire will provide the necessary traction. On the inner side of the circular steel rim, a sufficient number of anchor lugs, would be geometrically predisposed for the attachment of one end of the articulating spokes. These articulating spokes would be similar in action to a shock absorber and serve as a resilient cushioning unit to reduce and dampen the effect of any rough road surfaces. A circular steel ring would be attached and/or formed at a right angle to the circumferential side of the wheel, to serve and look like the sidewall of a regular tire. This unit would serve two functions. The first function is to resemble the contour of the side wall of a regular tire. The second function is to assist in parking the vehicle at curbside. This steel sidewall would also add to the circumferential strength of the tire rim. The hub end of the articulating spoke will be secured to a plate which is parallel to and a part of the brake assembly unit. An appropriate and suitable hubcap wheel cover would be used for cosmetic appearance.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A non-pneumatic tire and wheel system comprising, in combination:

a solid tire fabricated of an elastomeric material in an annular configuration having an exterior tread surface and an interior surface;

a wheel having a hub and a rim assembly sharing a common axis of rotation, a plurality of radially oriented shock absorbing spokes, each spoke having a radially interior end and a radially exterior end for coupling the hub and rim assembly;

the hub having a large central bore through the middle thereof, a plurality of smaller apertures equally spaced around the periphery for removably coupling the wheel to a vehicle and a plurality of radial extending lips with apertures there-through for pivotably coupling the hub to a spoke at its radially interior end;

the rim assembly having an interior rim and an exterior rim with the interior rim having a plurality of inwardly radially extending lips with apertures there-through for pivotably coupling the rim assembly to a spoke at its radially exterior end; and each shock absorbing spoke having a central cylindrical tube and an interior cap having an aperture and an exterior cap having an aperture, each spoke having an interior piston and rod with an aperture and with a pin pivotably coupling one of the spokes to the interior cylinder, each spoke having an exterior piston and rod with an aperture and with a pin pivotably coupling one of the spokes to the rim assembly, the interior pistons and exterior pistons dividing the space within each tube into an interior chamber and an exterior chamber and a central chamber, an interior coil spring between the interior cap and interior piston and an exterior coil spring between the exterior cap and exterior piston and an intermediate coil spring between the interior and exterior pistons, two one-way valves through each piston, each valve including an aperture for the flow of fluid there-through and a resilient uni-directional flapper whereby the rim assembly and spokes will deform when encountering a bump while the coil springs and valves will cushion the bumps during operation and use.

2. A non-pneumatic tire and wheel system comprising:

a tire having an exterior tread surface with a tread design and an interior surface;

a wheel having a hub and a rim assembly with a plurality of radially oriented shock absorbing spokes, each spoke having a radially interior end and a radially exterior end for coupling the hub and rim assembly;

apertures through the hub for pivotably coupling the hub to a spoke at the radially interior end of the spoke;

apertures through the rim assembly for pivotably coupling the rim assembly to a spoke at the radially exterior end of the spoke;

a central cylindrical tube associated with each shock absorbing spoke having an interior and an exterior cap, each spoke having an interior piston and rod and a pin pivotably coupling the spoke to the hub, each spoke having an exterior piston and rod and a pin pivotably coupling the spoke to the rim assembly, and the interior pistons and exterior pistons dividing the space within each tube into an interior chamber and an exterior chamber and a central chamber.

3. The system as set forth in claim 2 and further including an interior coil spring between the interior cap and interior piston and an exterior coil spring between the exterior cap and exterior piston and an intermediate coil spring between the interior and exterior pistons.

4. The system as set forth in claim 2 and further including two one-way valves through each piston, each valve including an aperture and a resilient uni-directional flapper.

* * * * *